US011142342B2

(12) United States Patent
Podnar et al.

(10) Patent No.: US 11,142,342 B2
(45) Date of Patent: Oct. 12, 2021

(54) INTELLIGENT BAGGAGE HANDLING

(71) Applicant: The Boeing Company, Chicago, IL (US)

(72) Inventors: Gregg W. Podnar, Lakewood, OH (US); Richard John Loftis, Arlington, WA (US); Gregory E. Mattocks, Bothell, WA (US); James J. Salmon, Kirkland, WA (US); Keith Harrell, Snohomish, WA (US)

(73) Assignee: The Boeing Company, Chicago, IL (US)

(*) Notice: Subject to any disclaimer, the term of this patent is extended or adjusted under 35 U.S.C. 154(b) by 532 days.

(21) Appl. No.: 15/335,312

(22) Filed: Oct. 26, 2016

(65) Prior Publication Data
US 2018/0111698 A1 Apr. 26, 2018

(51) Int. Cl.
*B64F 1/36* (2017.01)
*G06Q 50/28* (2012.01)
(Continued)

(52) U.S. Cl.
CPC ............ *B64F 1/368* (2013.01); *B64F 1/324* (2020.01); *B64F 1/366* (2013.01); *G06Q 10/043* (2013.01);
(Continued)

(58) Field of Classification Search
CPC . B64D 9/00; B64D 11/003; B64F 1/32; B64F 1/368; G06Q 10/043; G06Q 50/28; G06Q 10/08–0833; B65G 2201/0264
(Continued)

(56) References Cited

U.S. PATENT DOCUMENTS 4,446,524 A * 5/1984 Wendt ...................... B64D 9/00
701/124
5,175,692 A * 12/1992 Mazouz ................ B65G 61/00
414/900
(Continued)

FOREIGN PATENT DOCUMENTS

JP 03095028 A 4/1991
JP 03095028 A * 10/1991
(Continued)

OTHER PUBLICATIONS

Fok et al. "Optimizing Air Cargo Load Planning and Analysis". Proceeding of the International Conference on Computing, Communications and Control Technologies, Aug. 14-17, 2004. (Year: 2004).*
(Continued)

*Primary Examiner* — Michael P Harrington
*Assistant Examiner* — Brian A Tallman
(74) *Attorney, Agent, or Firm* — Duft & Bornsen, PC

(57) ABSTRACT

Systems and methods are provided for handling luggage. One exemplary system includes an interface that receives input from a check-in system that indicates sizes and weights for pieces of luggage that are each associated with a unique identifier; and a controller that selects a delivery, identifies pieces of luggage for the delivery, correlates the delivery with dimensions of a cargo hold of a vehicle servicing the delivery, receives input indicating a loading restriction for loading luggage into the cargo hold, and generates a baggage map. The baggage map is based on the sizes and the weights of the pieces of luggage for the delivery, indicates a location for each piece of luggage for the delivery within the cargo hold, and complies with the loading restriction. The system further includes a memory that stores the baggage map.

29 Claims, 9 Drawing Sheets

(51) Int. Cl.
*G06Q 10/08* (2012.01)
*G06Q 10/04* (2012.01)
*B64F 1/32* (2006.01)
*B64D 9/00* (2006.01)

(52) U.S. Cl.
CPC ......... *G06Q 10/0832* (2013.01); *G06Q 50/28* (2013.01); *B64D 9/00* (2013.01); *G06Q 10/08* (2013.01)

(58) Field of Classification Search
USPC .................................................. 705/330–332
See application file for complete search history.

(56) References Cited

U.S. PATENT DOCUMENTS

| | | | |
|---|---|---|---|
| 6,580,046 B1* | 6/2003 | Koini | B64F 1/368 209/564 |
| 7,021,449 B2 | 4/2006 | Koini et al. | |
| 2004/0226996 A1* | 11/2004 | Stefani | G01G 19/07 235/384 |
| 2006/0015396 A1* | 1/2006 | Blomeyer | G06Q 90/00 705/13 |
| 2006/0038077 A1 | 2/2006 | Olin et al. | |
| 2007/0284481 A1* | 12/2007 | Linero | B64D 9/00 244/137.1 |
| 2008/0065262 A1* | 3/2008 | Gottlieb | G06Q 10/08 700/213 |
| 2009/0105874 A1* | 4/2009 | Tietjen | B64D 9/00 700/217 |
| 2010/0100225 A1* | 4/2010 | Reed | B64D 9/00 700/213 |
| 2010/0249989 A1* | 9/2010 | Baldes | B65G 57/00 700/217 |
| 2011/0078182 A1* | 3/2011 | Fenyes | G06Q 10/08 707/770 |
| 2011/0313563 A1 | 12/2011 | Huber | |
| 2014/0077952 A1* | 3/2014 | Boss | G06Q 10/0832 340/572.1 |
| 2017/0154127 A1* | 6/2017 | Madmony | G06F 30/00 |
| 2018/0068266 A1* | 3/2018 | Kirmani | G01G 19/005 |
| 2018/0086464 A1* | 3/2018 | Riedel | G06T 7/70 |

FOREIGN PATENT DOCUMENTS

| | | |
|---|---|---|
| JP | 07069458 A | 3/1995 |
| JP | 2002059900 A | 2/2002 |
| JP | 2006277060 A | 10/2006 |
| WO | 2014032443 A1 | 3/2014 |

OTHER PUBLICATIONS

Kelly Fok et al; Optimizing Air Cargo Load Planning and Analysis; Aug. 17, 2004.
Mongeau M et al; Optimiization of Aircraft Container Loading; Jan. 1, 2003.
Hardeman, David, European Search Report—Application 17197832.3-1958, dated Nov. 23, 2017, Munich.
EP Office Action; Application 17197832.3; dated Jan. 25, 2019.
Japanese Office Action; Application 2017-146351; dated Mar. 15, 2021.

* cited by examiner

INTELLIGENT BAGGAGE HANDLING

FIELD

The disclosure relates to the field of vehicular transport, and in particular, to loading cargo onto bulk-loaded vehicles.

BACKGROUND

Airlines and their baggage service providers utilize a variety of techniques to ensure that passenger luggage is delivered to the correct aircraft in a timely manner. For example, pieces of luggage may be tagged at check-in with a barcode or with an RFID chip that indicates the corresponding flight destination and passenger information. The pieces of luggage may then be automatically conveyed to a staging area, from which they are distributed to the appropriate flight based on their tag. Baggage handlers transport the luggage into a cargo hold of the aircraft, and attempt to load the aircraft on a bag-by-bag basis which includes many ad-hoc decisions made by a baggage handler.

While current ad-hoc techniques for baggage loading are flexible, they are lacking in that it is impossible to know, a priori, how an aircraft will be loaded. This in turn is less than desirable when considering aircraft center of gravity during flight (impacting fuel consumption), aircraft balance during loading and/or unloading, and the retrieval time of specifically desired bags from the cargo hold (e.g., bags belonging to a passenger who has a need to quickly retrieve his or her bag).

Thus, airlines and their baggage service providers continue to seek out enhanced techniques for loading cargo holds of aircraft in a manner that reduces the severity of the concerns discussed above.

SUMMARY

Embodiments described herein quantify each incoming piece of baggage for a flight/delivery, before loading of that baggage begins. With a quantitative understanding of the luggage that will be placed onboard an aircraft/vehicle, combined with an understanding of the geometric properties of the cargo hold(s), the systems and methods described herein generate baggage maps that indicate a position of each piece of checked luggage within the cargo hold(s). This enables an accurate prediction of weight and balance, remaining volume left in the cargo hold(s), etc.

One exemplary embodiment is a system that includes an interface that receives input from a check-in system that indicates sizes and weights for pieces of luggage that are each associated with a unique identifier. The system also includes a controller that selects a delivery, identifies pieces of luggage for the delivery, correlates the delivery with dimensions of a cargo hold of a vehicle servicing the delivery, receives input indicating a loading restriction for loading luggage into the cargo hold, and generates a baggage map. The baggage map is based on the sizes and the weights of the pieces of luggage for the delivery, indicates a location for each piece of luggage for the delivery) within the cargo hold, and complies with the loading restriction. The system also includes a memory that stores the baggage map.

A further exemplary embodiment is a method. The method includes determining dimensions and weights of pieces of luggage for a delivery, identifying dimensions of a cargo hold of a vehicle servicing the delivery, identifying a loading restriction for loading luggage into the cargo hold, and generating, prior to loading of the vehicle, a baggage map for the delivery. The baggage map indicates a location for each piece of luggage for the delivery within the cargo hold, complies with the loading restriction, and is based on the dimensions and weights of the pieces of luggage for the delivery. Generating the baggage map is performed by subdividing the cargo hold into volume elements, and associating each piece of luggage with one or more volume elements of the cargo hold.

A further exemplary embodiment is a non-transitory computer readable medium embodying programmed instructions which, when executed by a processor, are operable for performing a method. The method includes determining dimensions and weights of pieces of luggage for a delivery, identifying dimensions of a cargo hold of a vehicle servicing the delivery, identifying a loading restriction for loading luggage into the cargo hold, and generating, prior to loading of the vehicle, a baggage map for the delivery. The baggage map indicates a location for each piece of luggage for the delivery within the cargo hold, complies with the loading restriction, and is based on the dimensions and weights of the pieces of luggage for the delivery. Generating the baggage map is performed by subdividing the cargo hold into volume elements, and associating each piece of luggage with one or more volume elements of the cargo hold.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
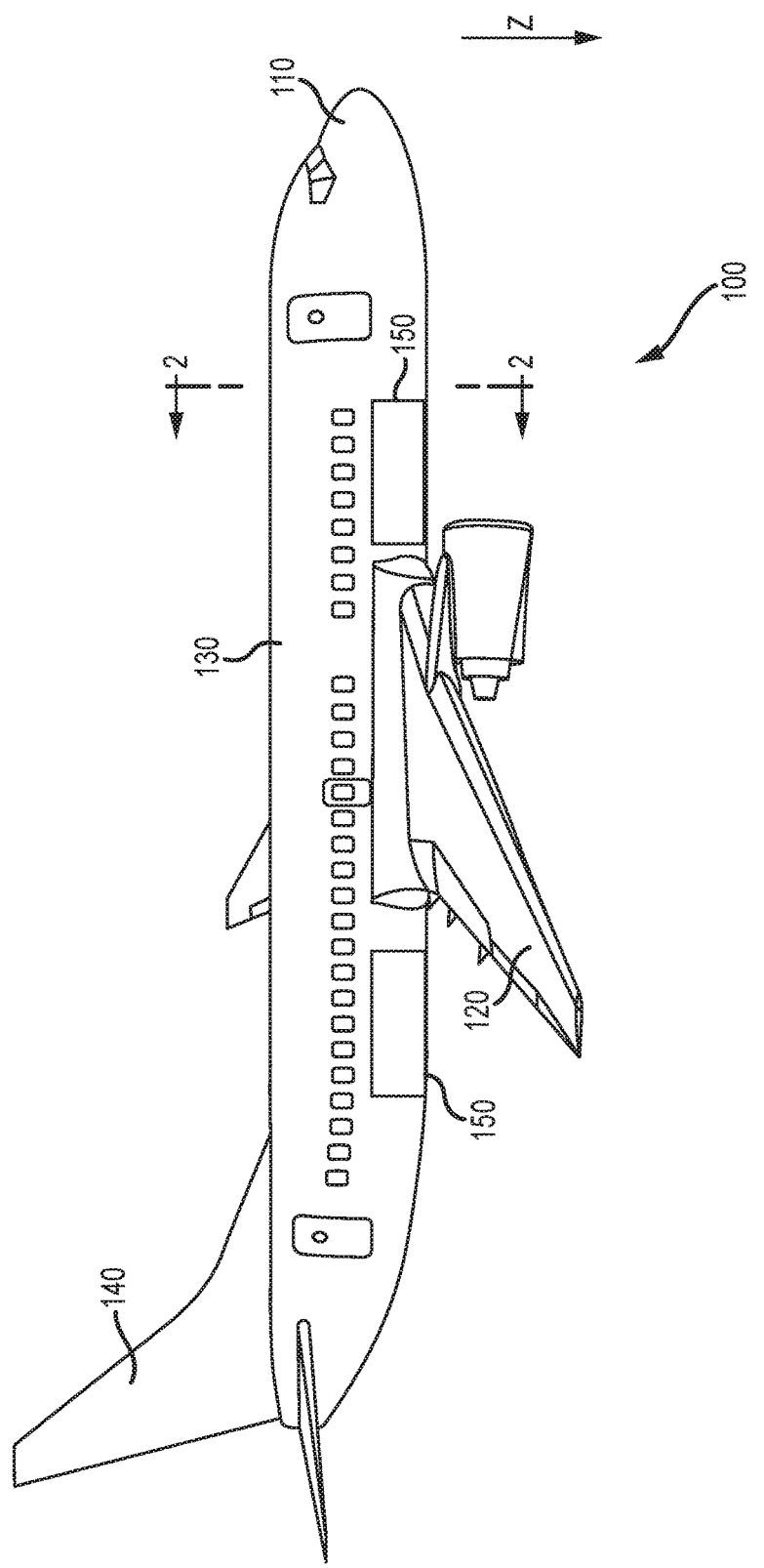
FIG. 1 is a block diagram of aircraft in an exemplary embodiment.
Figure 2:
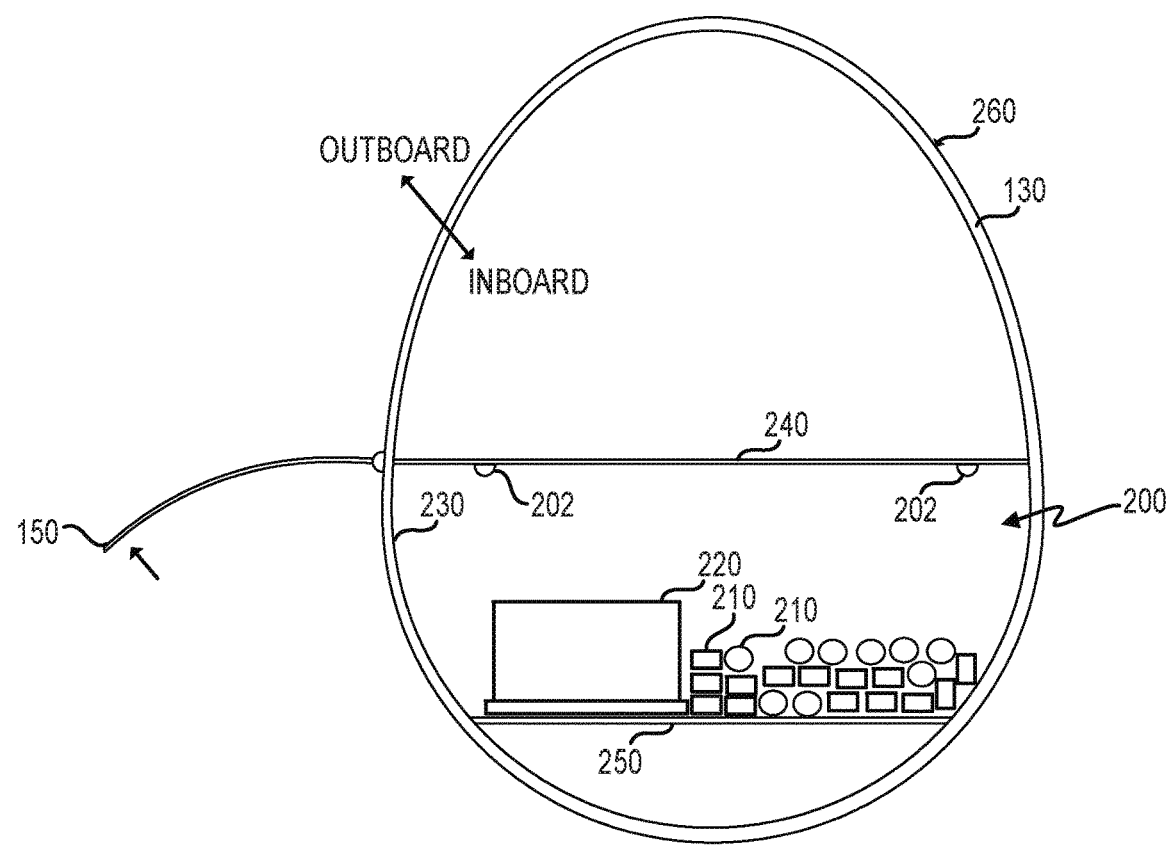
FIG. 2 is a section cut diagram illustrating a cargo hold of an aircraft in an exemplary embodiment.

FIGS. 1-2 illustrate the structure of an exemplary aircraft (e.g., a passenger aircraft) which may benefit from the use of a baggage map when loading and/or unloading pieces of luggage. Specifically, FIG. 1 is a diagram of an aircraft 100 in an exemplary embodiment. Aircraft 100 includes nose 110, wings 120, fuselage 130, tail 140, and cargo doors 150. FIG. 1 also illustrates a downward direction (Z) for aircraft 100.

FIG. 2 is a cut-through view of aircraft 100 indicated by view arrows 2 in FIG. 1. FIG. 2 illustrates a portion of aircraft fuselage 130. Fuselage 130 includes cargo hold 200 (here, a fore cargo hold), which is defined by walls 230, floor 250, and ceiling 240. Ceiling 240 also serves as a floor for a passenger section of aircraft 100. Cargo hold 200 occupies a three dimensional (3D) volume available for storing baggage. FIG. 2 illustrates that an outboard direction proceeds towards an external surface (e.g., skin 260) of aircraft 100, and an inboard direction proceeds towards the interior (e.g., cargo hold 200) of aircraft 100. FIG. 2 further illustrates pieces of luggage 210 within cargo hold 200, as well as revenue cargo 220. While pieces of luggage 210 may comprise baggage for passengers traveling on aircraft 100, or other goods that should be transported on a specific flight, revenue cargo 220 comprises goods that are desired for shipment on the current flight, but need not be transported on a specific flight, instead only needing to be delivered to a specific destination. In one embodiment, cargo hold 200 further includes sensors 202 (e.g., stereoscopic cameras or other imaging systems that are capable of detecting pieces of luggage 210 loaded into cargo hold 200).

Figure 3:
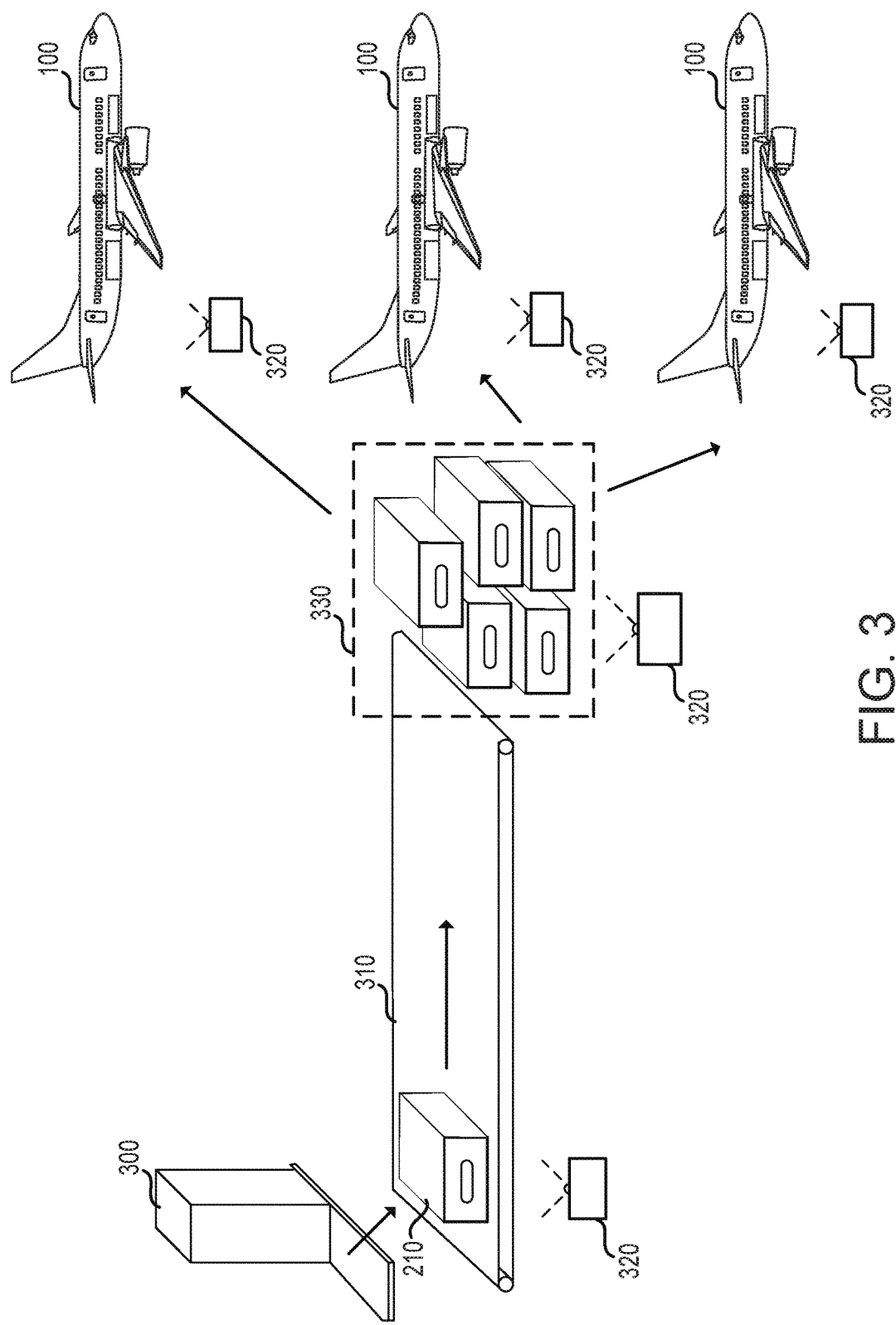
FIG. 3 is a diagram depicting luggage handling in an exemplary embodiment.

FIG. 3 is a diagram depicting luggage handling in an exemplary embodiment. As shown in FIG. 3, luggage 210 is received at a check-in desk 300, which may weigh and/or scan luggage 210 to determine the 3D size/dimensions and weight of luggage 210. Luggage 210 is placed onto conveyor 310, and may be scanned by a tag reader 320 (e.g., a Radio Frequency Identifier (RFID) scanner, a barcode scanner, etc.). Luggage 210 is transported by conveyor 310 to a staging area 330, from which a tag reader 320 identifies individual pieces of luggage 210, and distributes the pieces of luggage 210 to awaiting aircraft 100 which will be servicing flights for which luggage 210 is intended. Tag readers 320 at each aircraft enable each received piece of luggage 210 to be identified before loading, which enables the pieces of luggage to be loaded in accordance with a predefined 3D baggage map.

Figure 4:
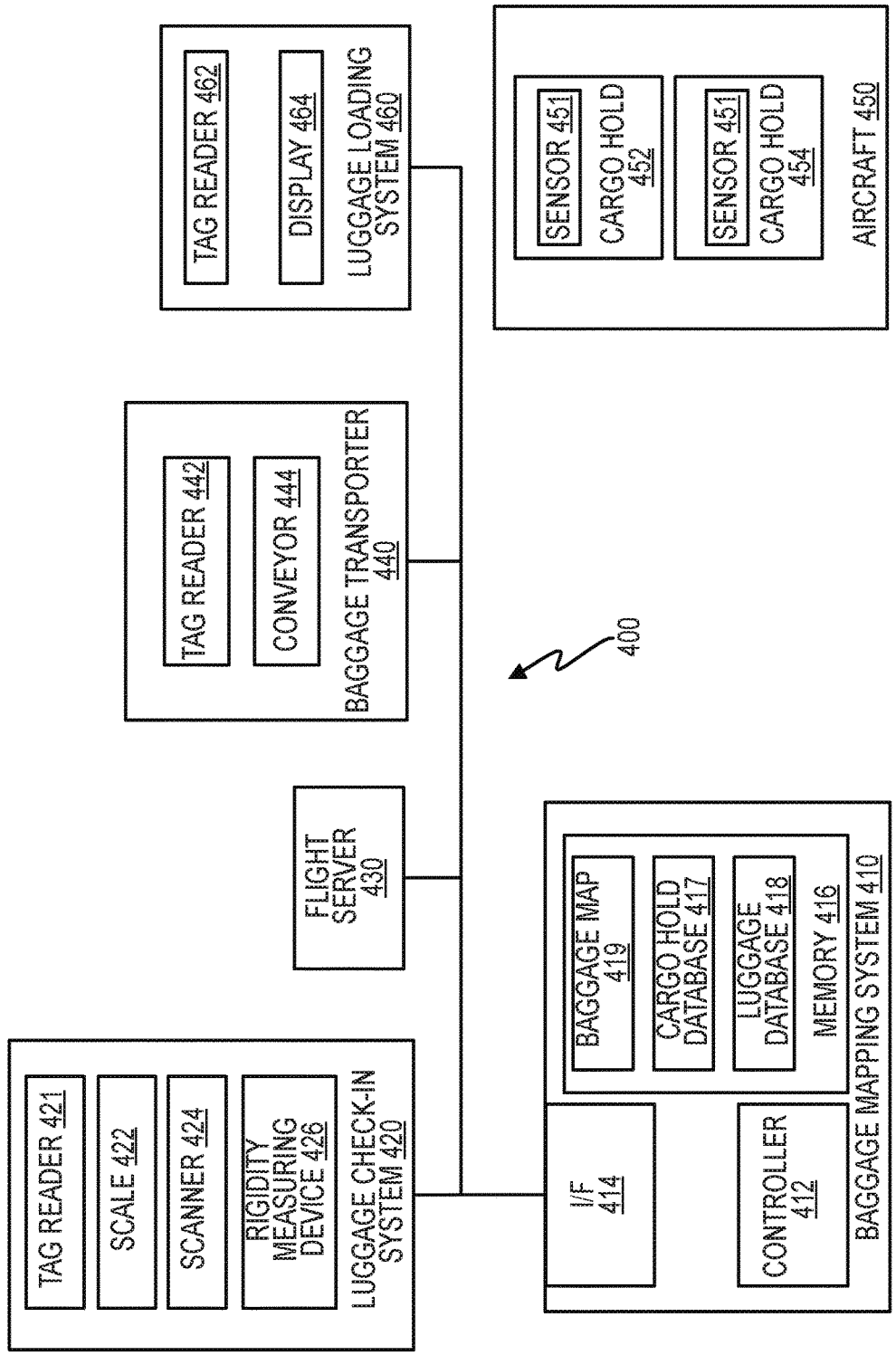
FIG. 4 is a block diagram illustrating a system for handling luggage for an aircraft in an exemplary embodiment.

FIG. 4 is a block diagram illustrating a system 400 for handling luggage for an aircraft in an exemplary embodiment. System 400 has been enhanced in that it is capable of quantifying the luggage that will be placed onto a given flight, and is capable of predictively generating one or more baggage maps indicating how to load one or more cargo holds 200 of an aircraft 100 servicing that flight. For example, in embodiments wherein an aircraft utilizes fore and aft cargo holds, system 400 may optimize the center of gravity of an aircraft by generating baggage maps that optimize the distribution of cargo weight between the fore and aft cargo holds.

In this embodiment, system 400 includes baggage mapping system 410, which performs operations of predictively generating a baggage map 419 for each of multiple flights. Baggage mapping system 410 includes controller 412, interface (I/F) 414, and memory 416. Memory 416 stores baggage maps 419, as well as a cargo hold database 417 indicating the volume and dimensions of cargo holds for varying models of aircraft (e.g., including door locations and/or strut or obstruction locations within those cargo holds. Memory 416 further comprises luggage database 418, which stores information quantifying each piece of luggage for a flight. For example, the information stored in luggage database 418 for each piece of luggage may indicate weight, dimensions, density, passenger name, departing gate, arriving gate, flight number, etc., for the piece of luggage. In a further embodiment, the information may indicate predefined dimensions known for specific brands and/or models of luggage. This information may even include, for example, whether the passenger associated with the luggage is a coach, business, or first class passenger, whether the piece of luggage is rigid, whether the luggage is marked as fragile, whether there are connecting flights, an indication of passenger status (e.g., traveling with small children, needing a wheelchair, etc.) and/or other information of interest.

Controller 412 manages the operations of baggage mapping system 410, by generating baggage maps 419 and processing information received via I/F 414. Controller 412 may be implemented, for example, as custom circuitry, as a processor executing programmed instructions, or some combination thereof. I/F 414 may comprise an Ethernet cable, Universal Serial Bus (USB) cable, IEEE 802.11 wireless protocol interface, etc.

FIG. 4 further illustrates luggage check-in system 420, which quantifies incoming pieces of luggage. In this embodiment, check-in system 420 includes tag reader 421 (e.g., a barcode or RFID chip reader), scale 422 which weighs pieces of luggage, scanner 424 which determines the dimensions of pieces of luggage, and rigidity measuring device 426. Rigidity measuring device 426 applies force to pieces of luggage to determine whether those pieces of luggage are rigid or soft. In a further embodiment, pictures of the pieces of luggage acquired by an imaging system may be analyzed to attempt to visually distinguish soft pieces of luggage from rigid pieces of luggage.

Flight server 430 maintains a list of incoming and/or outbound flights. By accessing flight server 430 via I/F 414, controller 412 determines which model of aircraft is servicing each flight. This information may be combined with information in cargo hold database 417 in order to determine the size of the cargo hold to fill, and which pieces of luggage will be entering the cargo hold for a given flight.

Baggage transporter 440 conveys pieces of luggage from check-in towards waiting aircraft 450. In this embodiment, baggage transporter 440 includes tag reader 442, which reads tags on pieces of checked luggage to determine a destination for each piece of luggage, and conveyor 444. Aircraft 450 includes cargo holds 452 and 454. Luggage loading system 460 is also depicted in FIG. 4. In this embodiment, luggage loading system 460 includes tag reader 462 and display 464. Loading system 460 may provide information to baggage mapping system 410 identifying pieces of luggage that are about to be loaded. Based on input from baggage mapping system 410, loading system 360 may update display 464 to illustrate locations at which to load these pieces of luggage within a cargo hold (452, 454) of aircraft 350. Sensors 451 are also illustrated.

Illustrative details of the operation of system 400 will be discussed with regard to FIG. 5. Assume, for this embodiment, that passengers have entered an airport, and are actively checking luggage for incoming flights. Checked pieces of luggage are being actively conveyed towards their intended destination aircraft, and baggage handlers await input indicating how each aircraft should be loaded.

Figure 5:
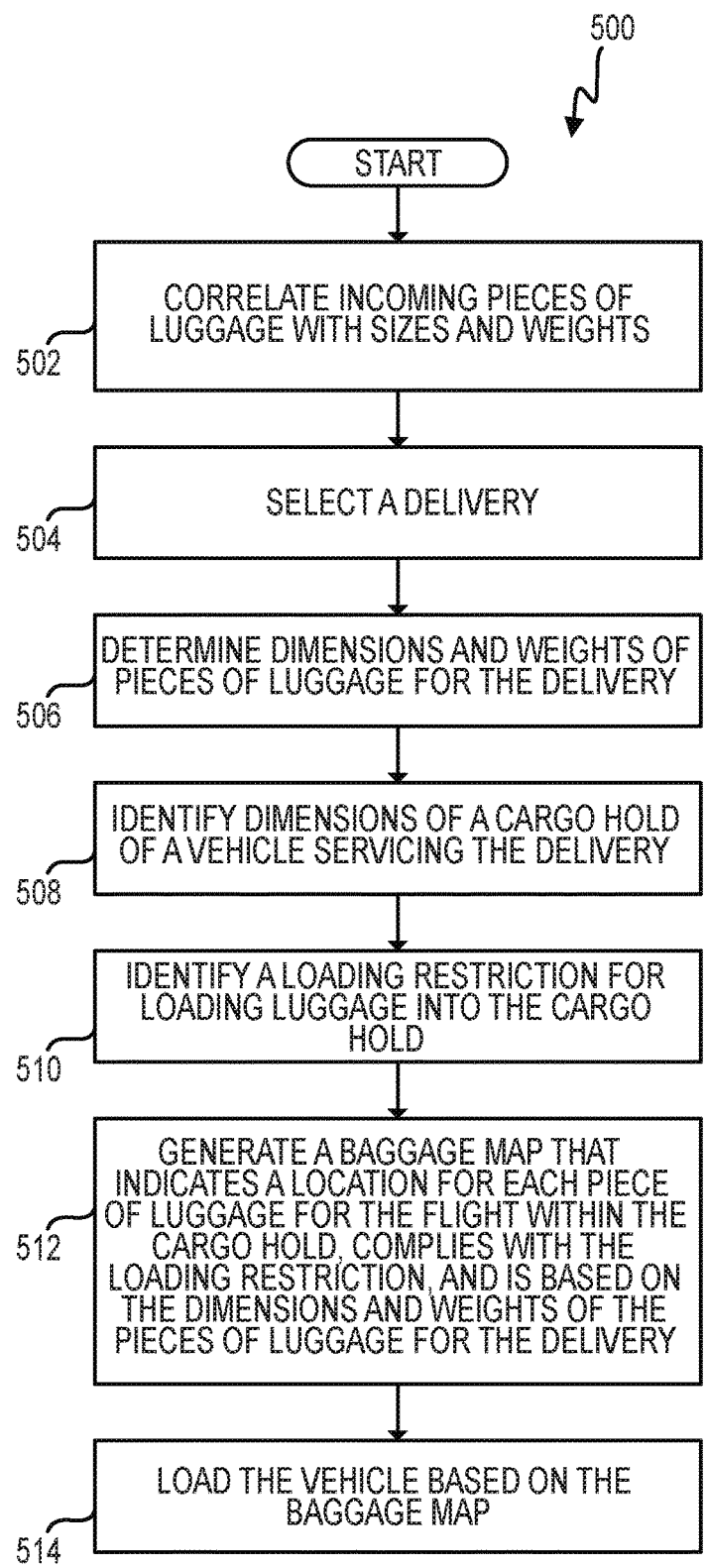
FIG. 5 is a flowchart illustrating a method for predictively generating a baggage map for a cargo hold in an exemplary embodiment.

FIG. 5 is a flowchart illustrating a method 500 for predictively generating a baggage map for one or more cargo holds in an exemplary embodiment. The steps of method 500 are described with reference to system 400 of FIG. 4, but those skilled in the art will appreciate that method 500 may be performed in other luggage handling systems. The steps of the flowcharts described herein are not all inclusive and may include other steps not shown. The steps described herein may also be performed in an alternative order.

Check-in system 420 receives pieces of luggage 210, and operates tag reader 421 to determine a unique identifier for each received piece of luggage 210. Furthermore, scale 422 and scanner 424 quantify the weight and size/dimensions of each received piece of luggage 210. For example, scanner 424 may quantify the size of each piece of luggage 210 "as is," including the size of any zippered and/or mesh expandable/expansion pockets on those pieces of luggage. Check-in system 420 further associates the identifiers with the sizes and the weights (step 502). Interface (I/F) 414 receives input (e.g., from check-in system 420) associating incoming pieces of luggage with corresponding sizes and weights. Thus, as pieces of luggage 210 are checked-in by passengers, baggage mapping system 420 acquires information describing those pieces of luggage 210 and updates luggage database 418. Controller 412 processes this information, and selects a delivery (e.g., a passenger flight) (step 504). A delivery/flight may be selected based on a departure time, based on input from baggage handlers indicating that loading has started for the flight (or will start within a predefined time period), or may even be selected based on all passengers for the flight having checked in.

With the delivery/flight identified, controller 412 proceeds to determine dimensions and weights of pieces of luggage for the flight (e.g., by identifying pieces of luggage for the flight that have been previously quantified in step 502) (step 506). In one embodiment, the pieces of luggage 210 for the flight are items which will be loaded for passengers of the flight, and hence are considered non-optional for loading purposes. Controller 412 may identify the pieces of luggage 210 for the flight by reviewing luggage database 418.

Controller 412 further identifies the dimensions of a cargo hold 200 of a vehicle (e.g., an aircraft) servicing the delivery/flight (e.g., by identifying the model of aircraft that will service the flight, and accessing cargo hold database 417) (step 508). This step takes into account the fact that vehicle cargo holds vary in size and shape, which complicates the loading process. Controller 412 also identifies a loading restriction for loading pieces of luggage into cargo hold 200 (step 510). As used herein, a loading restriction dictates a specific goal to be achieved when loading cargo hold 200. For example, a loading restriction may request/specify that a baggage map include a predefined empty volume in the cargo hold. Such empty volumes may be filled with revenue cargo (e.g., postal parcels) to enhance the revenue generated by the flight.

With the loading restriction determined, controller 412 generates a baggage map 419 for the delivery/flight. Baggage map 419 indicates a location for each piece of luggage 210 for the flight within cargo hold 200, complies with the loading restriction, and is based on the dimensions and weight of the pieces of luggage 210 for the flight (step 512). This process may involve categorizing each piece of luggage 210 based on its weight and dimensions, and engaging in a stochastic (e.g., simulated annealing) or deterministic (e.g., a Nelder-Meade simplex) optimization technique, wherein the scoring function is based on the loading restriction. Thus, for the loading restriction requesting that a predefined volume of space (e.g., having specified dimensions) remain open within cargo hold 200, potential loadouts may be scored based on whether they provide such a volume of space. Further criteria for scoring may indicate ease of loading, balance provided to the aircraft 100, estimated loading or unloading time, etc. Controller 412 may further update baggage map 419 upon receiving information that more pieces of luggage 210 (or fewer pieces of luggage 210) are to be loaded into cargo hold 200 for the delivery/flight.

The acceptance of pieces of luggage 210 and their movement to an aircraft is largely a serial process. After baggage map 419 has been created, it may be desirable to re-sequence pieces of luggage 210 such that they arrive at the cargo hold in the desired sequence. This may in turn involve a random-access temporary storage of the luggage pieces. For example, pieces of luggage pieces 210 may be stacked in pre-determined locations on a train of luggage carts, such that when a baggage handler starts with a first of the luggage carts and proceeds moving bags from the cart to a loading mechanism, the pieces of luggage 210 arrive at cargo hold 200 in the proper sequence.

Thus, with baggage map 419 generated, baggage handlers proceed to load aircraft 100 at loading system 460 based on baggage map 419. This may comprise controller 412 receiving requests/input from tag reader 462 identifying each next piece of luggage 210 that is ready to load for the flight, and generating instructions in response to the requests that direct display 464 to present information describing the desired location for that piece of luggage in cargo hold 200 (e.g., by transmitting an instruction/command to display 464 to visually depict locations at which to place the next pieces of luggage indicated in the requests). The information may be represented textually and/or graphically. These techniques may further be utilized to load ground transportation vehicles such as railway cars, semi-trucks, delivery vans, etc. to enable more efficient/quick unloading and package tracking from departure to delivery. Utilizing method 500, the loading of one or more cargo holds 200 may be predictively planned instead of being performed ad-hoc. For example, controller 412 may generate/optimize multiple baggage maps for multiple cargo holds of an aircraft at the same time, in order to ensure a requested/predefined weight distribution at an aircraft. This provides the ability to predictively determine the impact of cargo on the balance of an aircraft 100 (impacting the amount of fuel loaded onto the aircraft) and further allows for predictively determining whether or not revenue cargo will fit on the aircraft 100. An additional benefit is achieved in that an experienced luggage handler is not needed in order to achieve specific loading goals, since baggage mapping system 410 predictively ensures that those goals are achieved. Furthermore, predictively generating baggage maps based on the known sizes and weights of pieces of luggage 210 yields more accurate determinations of cargo hold weight and configuration (e.g., balance and/or center of gravity), which facilitates an estimate of fuel usage during flight, and further facilitates the calibration of flight, takeoff, and/or landing calculations. For example, each time interface 414 receives input from loading system 460 identifying a next piece of luggage 210 to load into cargo hold 200, controller 412 may analyze baggage map 419 to identify a location in which to place the piece of luggage 210, and transmit an instruction to display 464 (e.g., located on a baggage handling vehicle within a baggage train proximate to cargo hold 200, or located on a mobile device utilized by a baggage handler) in order to present an image of the location. In a further embodiment, controller 412 may even operate a speaker (e.g., at display 464, such as a monitor or projector) in order to aurally indicate a location when loading or retrieving a piece of luggage 210. In embodiments where display 464 is a projector, display 464 may illuminate a portion of cargo hold 210 for loading, and may even project images of pieces of luggage 210 according to their desired locations indicated in baggage map 419. In a further embodiment, display 464 comprises a stereoscopic headset which may present locations indicated in baggage map 419 in a virtual reality or alternate reality view overlay on top of cargo hold 200.

Method 500 further provides an advantage by enabling the retrieval of individual pieces of luggage 210 from a cargo hold 200, since a baggage map 419 indicates the location of each piece of luggage 210 in the cargo hold 200. That is, as interface 414 receives input from loading system 460 identifying a piece of luggage 210 to off-load from cargo hold 200, controller 412 identifies a location in cargo hold 200 for the piece of luggage 210 to off-load based on baggage map 419, and generates an instruction transmitted via interface 414 to display 464 in order to visually depict the location via the loading system.

Further benefits related to reduced load times and/or labor may also be realized by predictively determining how cargo holds 200 of an aircraft 100 will be loaded. In further embodiments, as pieces of luggage are moved from cargo hold 200 to a carousel at an airport, passengers (or other cargo recipients) may track the locations of these pieces of luggage via an application loaded onto a mobile device (e.g., cellular phone, tablet, etc.).

In further examples, a loading restriction may request that a baggage map 419 (or set of baggage maps 419 for an aircraft/vehicle) specify/provide a weight distribution for the pieces of luggage for the flight that ensures a desired/predefined/requested center of gravity of the aircraft (e.g., from side to side or fore to aft). In one embodiment, the desire is to optimize the center of gravity (or center of pressure) location (within the operating limits of the aircraft) to minimize balancing tail loads required, thus reducing trim drag of the aircraft during flight and enhancing fuel economy. Even for an aircraft without tail surfaces, there may be a desire to optimize the center of gravity location of the aircraft to minimize drag. Indeed, most efficient flight and/or transport characteristics may be used as loading restrictions which provide criteria for generating a baggage map. For example, efficient cargo loading may help to reduce fuel consumption and labor while increasing passenger and baggage handler safety.

In a further embodiment, controller 412 may identify seating locations of passengers within the cabin of the aircraft. A baggage map may then be determined by taking into consideration the most likely loading of the cabin based on those seating locations. Such calculations may further take into account statistical methods to estimate the average weight of the passengers and/or the number of carry-on bags that will be loaded on board the aircraft during the flight. This may provide for a complete calculation of total weight and/or balance at the aircraft. In a further embodiment, carry-on bags may be pre-located, loaded, and/or stowed (e.g., with flight attendant assistance and/or boarding pass direction) to facilitate boarding and deboarding of the aircraft.

Yet another example of a loading restriction may specify/request that the baggage map 419 stack pieces of luggage 210 for the flight from bottom to top in order of density and/or weight in order to reduce labor and facilitate loading/unloading ergonomics for baggage handlers, by orienting pieces of luggage so that their handles are easily accessible during loading, or to stack pieces of luggage 210 according to customer preferences (e.g., requesting that a desired side of a piece of luggage face upward during the flight). In one embodiment, a loading restriction places first class and/or business baggage on top of coach baggage (or in another desirable position relative to coach bags), to ensure that the first class and/or business baggage is retrieved first during unloading.

Figure 6:
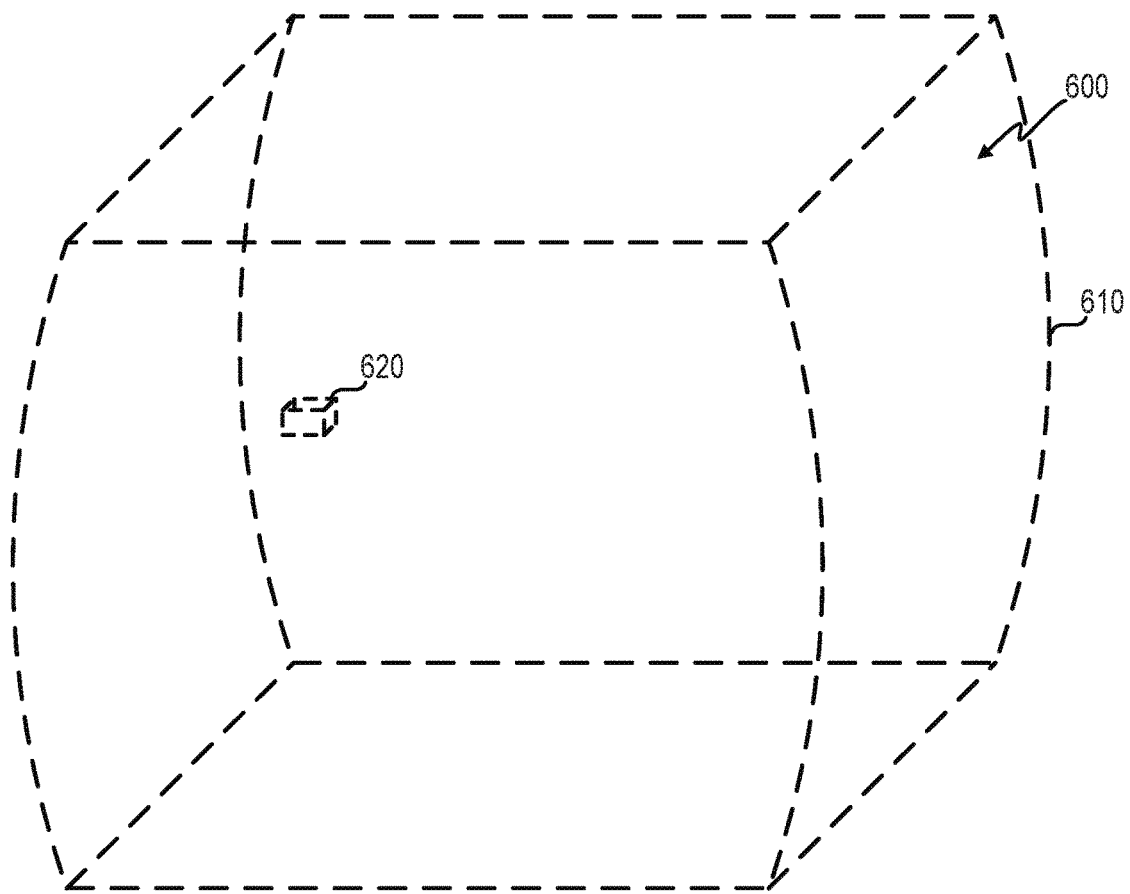
FIG. 6 is a diagram illustrating a volume of a cargo hold in an exemplary embodiment.
Figure 7:
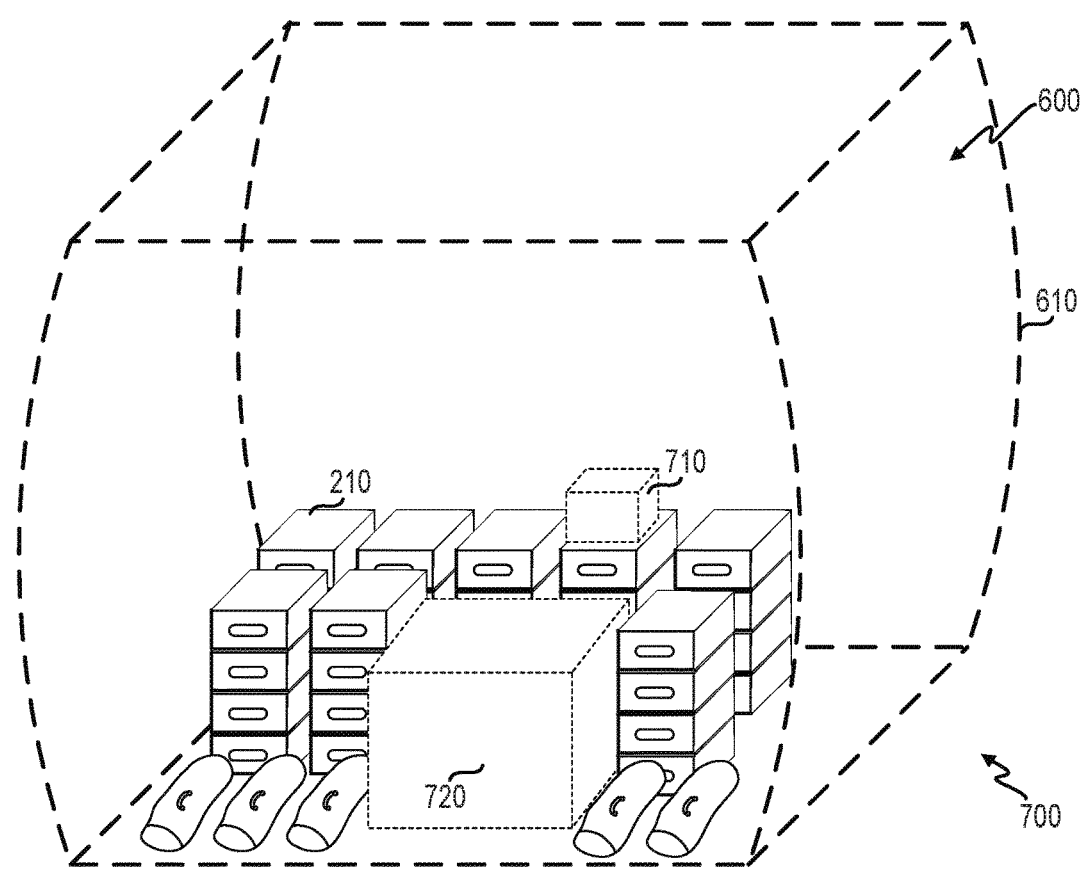
FIG. 7 is a diagram illustrating a predictive baggage map for a cargo hold in an exemplary embodiment.
Figure 8:
FIG. 8 is a table illustrating information stored in a baggage map in an exemplary embodiment.

FIG. 6 is a diagram illustrating a volume 600 of a cargo hold in an exemplary embodiment. As shown in FIG. 6, volume 600 may be defined by borders 610 (which need not be box-shaped, and may have round edges or irregularities in shape). During generation of a baggage map 419, controller 412 may subdivide volume 600 into volume elements ("voxels"), and then associate individual pieces of luggage with one or more voxels. When associating pieces of luggage with voxels within a baggage map, controller 412 may further include an extra portion of empty space padding each piece of luggage, in order to account for protruding handles, wheels, or other features extending from a piece of luggage. FIG. 7 is a diagram illustrating a predictive baggage map 700 for a cargo hold 200 in an exemplary embodiment. As shown in FIG. 7, baggage map 700 indicates a position/volume (e.g., volume 710) for each piece of luggage in aircraft 100. Furthermore, baggage map 700 includes an open volume 720 in which revenue cargo may be stored. FIG. 8 illustrates a table 800 illustrating information stored in a baggage map in an exemplary embodiment. Specifically, table 800 lists positions, dimensions, and weights for individual pieces of luggage to be loaded into a cargo hold, based on a luggage identifier (ID). Based on the positions and dimensions of a piece of luggage, the volume occupied by that piece of luggage may be determined.

In a further embodiment, interface 414 receives input from check-in system 420 assigning each of the pieces of luggage 210 to either hard class (e.g., hard-sided) or soft class (e.g., soft-sided), controller 412 generates baggage map 419 based on the sizes, weights, and classes of the pieces of luggage for the flight (e.g., by placing hard and/or dense luggage lower in cargo hold 200).

In a further embodiment, sensors 202 detect the position and orientation of each piece of luggage 210 within cargo hold 200 to ensure proper loading in accordance with baggage map 419. If a piece of luggage 210 is not loaded as desired, loading system 460 detects this condition and may either request that the baggage handler reposition the piece of luggage 210, or may request a revised baggage map from baggage mapping system 410 that takes into account this unexpected loading deviation.

Examples

Figure 9:
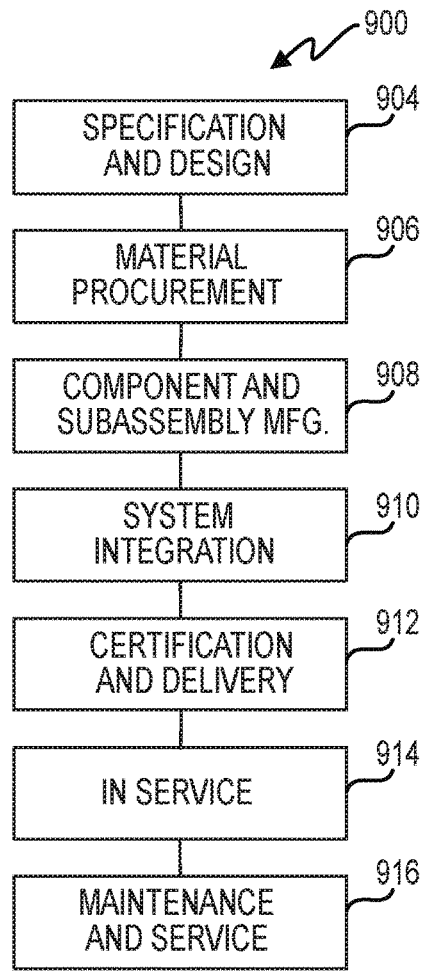
FIG. 9 is a flow diagram of aircraft production and service methodology in an exemplary embodiment.
Figure 10:
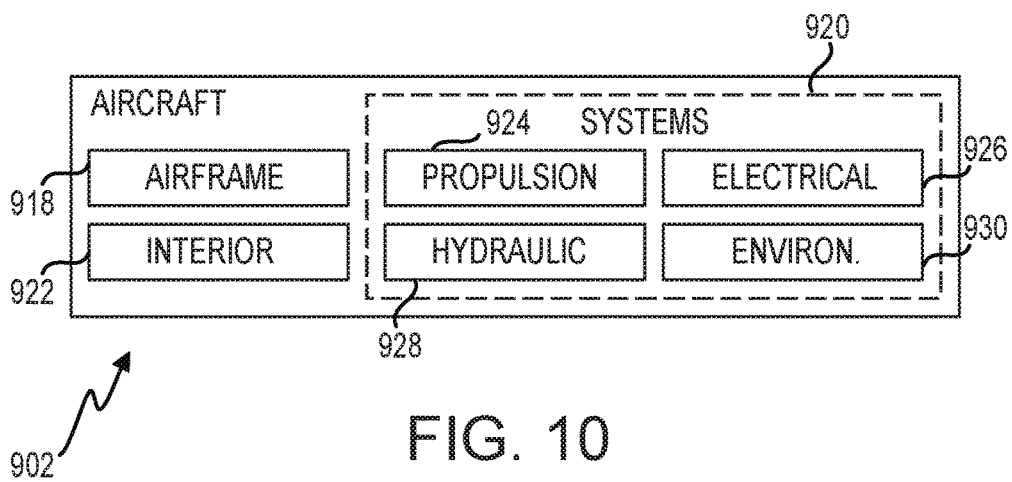
FIG. 10 is a block diagram of an aircraft in an exemplary embodiment.

In the following examples, additional processes, systems, and methods are described in the context of aircraft service. Referring more particularly to the drawings, embodiments of the disclosure may be described in the context of an aircraft manufacturing and service method 900 as shown in FIG. 9 and an aircraft 902 as shown in FIG. 10. During pre-production, exemplary method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916 (which may also include modification, reconfiguration, refurbishment, and so on). Apparatus and methods embodied herein may be employed during any one or more suitable stages of the production and service method 900 (e.g., specification and design 904, material procurement 906, component and subassembly manufacturing 908, system integration 910, certification and delivery 912, service 914, maintenance and service 916) and/or any suitable component of aircraft 902 (e.g., airframe 918, systems 920, interior 922, propulsion 924, electrical 926, hydraulic 928, environmental 930).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 902 produced by exemplary method 900 may include an airframe 918 with a plurality of systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 900. For example, components or subassemblies corresponding to production stage 908 may be fabricated or manufactured in a manner similar to components or subassemblies produced while the aircraft 902 is in service. Also, one or more apparatus embodiments, method embodiments, or a combination thereof may be utilized during the production stages 908 and 910, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 916. For example, the techniques and systems described herein may be used for steps 906, 908, 910, 914, and/or 916, and/or may be used for airframe 918 and/or interior 922. These techniques and systems may even be utilized for systems 920, including for example propulsion 924, electrical 926, hydraulic 928, and/or environmental 930.

In one embodiment, during service 914 and/or maintenance and service 916, controller 412 generates baggage maps 700 for loading aircraft that are servicing outgoing flights. Baggage handlers and/or robots may further load the aircraft based on the baggage maps, in order to ensure that pieces of luggage are loaded in the desired manner.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
   a baggage mapping system comprising:
      an interface configured to receive input from a check-in system that indicates sizes and weights for pieces of luggage that are each associated with a unique identifier;
      a controller configured to select a delivery, identify pieces of luggage for the delivery, correlate the delivery with dimensions of a cargo hold of an aircraft servicing the delivery, receive input indicating a loading restriction for loading luggage into the cargo hold, and generate a baggage map, wherein the loading restriction dictates that the baggage map include a predefined empty volume having specified dimensions in the cargo hold,
      wherein the baggage map indicates unique volumes occupied by each of the pieces of luggage, by assigning each piece of luggage to multiple voxels that the cargo hold has been subdivided into, and
      wherein the baggage map complies with the loading restriction, is generated via an optimization technique that generates potential loadouts based on the sizes and the weights, and scores the potential loadouts via a scoring function having scoring criteria pertaining to fulfillment of the loading restriction, wherein the optimization technique facilitates an estimate of at least one of the group selected from: flight calculations, takeoff calculations, landing calculations, trim drag, and tail load;
      a memory configured to store the baggage map; and
   a loading system configured to direct baggage handlers in loading the cargo hold of the aircraft in accordance with the baggage map by illustrating locations at which to load the pieces of luggage within the cargo hold, wherein the controller includes in the baggage map an extra portion of empty space padding each of the pieces of luggage, in order to account for at least one feature selected from the group consisting of: handles and wheels.

2. The system of claim 1, wherein:

the interface is configured to receive input from the loading system identifying a next piece of luggage to load into the cargo hold; and the controller is configured to analyze the baggage map to identify a location in the cargo hold for the next piece of luggage and transmit an instruction directing a display to present an image of the location in the cargo hold for the next piece of luggage.

3. The system of claim 1, wherein:

the loading restriction specifies that the baggage map orient the pieces of luggage so that the handles are accessible during loading.

4. The system of claim 1, wherein:

illustrating the locations is performed by a stereoscopic headset via an alternate reality view overlaid on top of the cargo hold.

5. The system of claim 1, wherein:

the controller is configured to include the predefined empty volume as a location to store revenue cargo, and each of the potential loadouts is scored based on whether the potential loadout provides an empty volume having the specified dimensions.

6. The system of claim 5, wherein:

the predefined empty volume is defined based on dimensions of revenue cargo.

7. The system of claim 1, wherein:

the optimization technique is selected from the group consisting of: a Nelder-Meade simplex and simulated annealing.

8. The system of claim 1, further comprising:

the check-in system, wherein the check-in system is configured to receive the pieces of luggage, read tags to determine identifiers for the pieces of luggage, determine sizes and weights for the pieces of luggage, and associate the identifiers with the sizes and the weights.

9. The system of claim 1, wherein:

the loading system is configured to read a tag to determine an identifier for a piece of luggage prior to loading the piece of luggage onto the aircraft, query the baggage mapping system based on the identifier, receive input indicating a location defined by the baggage map for the piece of luggage in the cargo hold, and display the location for viewing by a baggage handler.

10. A method comprising:

determining dimensions and weights of pieces of luggage for a delivery;

identifying dimensions of a cargo hold of an aircraft;

subdividing the cargo hold into voxels;

identifying a loading restriction for loading luggage into the cargo hold, wherein the loading restriction dictates that the baggage map include a predefined empty volume having specified dimensions in the cargo hold;

generating, prior to loading of the aircraft, a baggage map for the delivery, wherein the baggage map indicates unique volumes occupied by each of the pieces of luggage, by assigning each piece of luggage to multiple voxels that the cargo hold has been subdivided into, wherein the baggage map is generated via an optimization technique that generates potential loadouts based on the dimensions and the weights and scores the potential loadouts via a scoring function having scoring criteria pertaining to fulfillment of the loading restriction, and wherein the optimization technique facilitates an estimate of at least one of the group selected from: flight calculations, takeoff calculations, landing calculations, trim drag, and tail load;

directing baggage handlers to load the cargo hold of the aircraft in accordance with the baggage map, by illustrating locations at which to load the pieces of luggage within the cargo hold; and including in the baggage map an extra portion of empty space padding each of the pieces of luggage, in order to account for at least one feature selected from the group consisting of: handles and wheels.

11. The method of claim 10, further comprising:

receiving input identifying a next piece of luggage to load into the cargo hold;

analyzing the baggage map to identify a location for the next piece of luggage; and operating a display to present an image of the location for the next piece of luggage.

12. The method of claim 10, wherein:

the loading restriction specifies that the baggage map orient the pieces of luggage so that the handles are accessible during loading.

13. The method of claim 10, further comprising:

receiving input from a loading system identifying a piece of luggage to off-load from the cargo hold;

identifying a location in the cargo hold for the piece of luggage to off-load, based on the baggage map; and operating a display to present an image of the location in the cargo hold for the piece of luggage to off-load.

14. The method of claim 10, further comprising:

receiving input from a loading system identifying a piece of luggage to off-load from the cargo hold;

identifying a location in the cargo hold for the piece of luggage to off-load, based on the baggage map; and operating a speaker to aurally indicate the location in the cargo hold for the piece of luggage to off-load.

15. The method of claim 10, wherein:

illustrating the locations is performed by a stereoscopic headset via an alternate reality view overlaid on top of the cargo hold.

16. The method of claim 10, wherein:

the method further comprises updating the baggage map to include the predefined empty volume as a location to store revenue cargo, wherein each of the potential loadouts is scored based on whether the potential loadout provides an empty volume having the specified dimensions.

17. The method of claim 10, wherein:

the predefined empty volume is defined based on dimensions of revenue cargo.

18. The method of claim 10, wherein:

the optimization technique is selected from the group consisting of: a Nelder-Meade simplex and simulated annealing.

19. The method of claim 10, further comprising:

loading the aircraft based on the baggage map.

20. A non-transitory computer-readable medium embodying programmed instructions which, when executed by a processor, are operable for performing a method comprising:
  determining dimensions and weights of pieces of luggage for a delivery;
  identifying dimensions of a cargo hold of an aircraft;
  subdividing the cargo hold into voxels;
    identifying a loading restriction for loading luggage into the cargo hold, wherein the loading restriction dictates that the baggage map include a predefined empty volume having specified dimensions in the cargo hold;
  generating, prior to loading of the aircraft, a baggage map for the delivery, wherein the baggage map indicates unique volumes occupied by each of the pieces of luggage, by assigning each piece of luggage to multiple voxels that the cargo hold has been subdivided into,
    wherein the baggage map is generated via an optimization technique that generates potential loadouts based on the dimensions and the weights and scores the potential loadouts via a scoring function having scoring criteria pertaining to fulfillment of the loading restriction, and wherein the optimization technique facilitates an estimate of at least one of the group selected from: flight calculations, takeoff calculations, landing calculations, trim drag, and tail load;
  directing baggage handlers to load the cargo hold of the aircraft in accordance with the baggage map, by illustrating locations at which to load the pieces of luggage within the cargo hold; and
  including in the baggage map an extra portion of empty space padding each of the pieces of luggage, in order to account for at least one feature selected from the group consisting of: handles and wheels.

21. The medium of claim 20, wherein the method further comprises:
  receiving input identifying a next piece of luggage to load into the cargo hold;
  analyzing the baggage map to identify a location for the next piece of luggage; and
  operating a display to present an image of the location for the next piece of luggage.

22. The medium of claim 20, wherein:
  the loading restriction specifies that the baggage map orient the pieces of luggage so that the handles are accessible during loading.

23. The medium of claim 20, wherein the method further comprises:
  receiving input from a loading system identifying a piece of luggage to off-load from the cargo hold;
  identifying a location in the cargo hold for the piece of luggage to off-load, based on the baggage map; and
  operating a display to present an image of the location in the cargo hold for the piece of luggage to off-load.

24. The medium of claim 20, wherein the method further comprises:
  receiving input from a loading system identifying a piece of luggage to off-load from the cargo hold;
  identifying a location in the cargo hold for the piece of luggage to off-load, based on the baggage map; and
  operating a speaker to aurally indicate the location in the cargo hold for the piece of luggage to off-load.

25. The medium of claim 20, wherein:
  illustrating the locations is performed by a stereoscopic headset via an alternate reality view overlaid on top of the cargo hold.

26. The medium of claim 20, wherein:
  the loading restriction specifies a predefined empty volume having specified dimensions in the cargo hold, the method further comprises updating the baggage map to include the predefined empty volume as a location to store revenue cargo, wherein each of the potential loadouts is scored based on whether the potential loadout provides an empty volume having the specified dimensions.

27. The medium of claim 20, wherein:
  the predefined empty volume is defined based on dimensions of revenue cargo.

28. The medium of claim 20, wherein:
  the optimization technique is selected from the group consisting of: a Nelder-Meade simplex and simulated annealing.

29. The medium of claim 20, wherein the method further comprises:
  loading the aircraft based on the baggage map.

* * * * *